United States Patent [19]

Duy et al.

[11] 3,885,058

[45] May 20, 1975

[54] METHOD OF MANUFACTURING CADMIUM SULPHIDE PHOTOCELLS

[75] Inventors: Thuoc Nguyen Duy, Ivry; Wolfgang Palz, Paris; Jacques Vedel, Asnieres, all of France

[73] Assignee: The Unites States of America as represented by the Secretary of the Navy, Washington, D.C.

[22] Filed: Apr. 27, 1973

[21] Appl. No.: 355,147

[30] Foreign Application Priority Data

May 3, 1972 France .............................. 72.15598

[52] U.S. Cl. .................... 427/10; 136/89; 204/35 R; 156/280; 427/74

[51] Int. Cl. ............................ B44d 1/44; B44d 1/18

[58] Field of Search ............. 117/200, 201, 113, 62, 117/213, 217; 136/89; 204/35 R

[56] References Cited

UNITED STATES PATENTS

| | | | |
|---|---|---|---|
| 3,142,586 | 7/1964 | Colman | 117/62 |
| 3,374,108 | 3/1968 | Keramidas | 117/200 |
| 3,416,956 | 12/1968 | Keramidas | 117/200 |
| 3,480,473 | 11/1969 | Tanos | 117/62 |

*Primary Examiner*—Michael F. Esposito
*Attorney, Agent, or Firm*—Richard S. Sciascia; Joseph M. St. Amand; T. M. Phillips

[57] ABSTRACT

A method for manufacturing a CdS photocell comprising a layer of $Cu_2S$ to which there is adhered a collector grid, the adhesion producing oxidation of the $Cu_2S$ layer, said method comprising dipping the photocell to which the grid has just been adhered into a solution of cuprous ions and withdrawing the photocell when the curve representing the variations with respect to time of the potential difference between the photocell and a pure copper electrode dipped into the same solution passes through its minimum value.

2 Claims, 2 Drawing Figures

METHOD OF MANUFACTURING CADMIUM SULPHIDE PHOTOCELLS

The present invention relates to an improvement in the manufacture of cadmium sulphide solar cells comprising a layer of copper sulphide.

Such cells have already been manufactured, in particular by the Electronic Research Division of the CLEVITE CORPORATION which published on Dec. 30, 1966 a report on this subject entitled "Study of thin film large area photovoltaic solar energy convertor" written by F. A. SHIRLAND, J. R. HEITANEN and W. C. DOWER and prepared for the National Aeronautics and Space Administration.

French Pat. No. 1,562,163 describes specific technological methods which are employed for producing in the best way the junctions between the interfaces of different chemical media of the various layers constituting the photocell, which are : a silver layer which is the first electrode of the photocell, a zinc layer which diminishes the ohmic resistance of contact between the silver electrode and the layer of CdS, the layers of CdS and $Cu_2S$ which are the active layers of the photocell ; a second electrode which is in the form of a grid arranged in a squared pattern on the sensitive surface of the photocell and a protective layer which protects the sensitive surface of the photocell from attack by exterior agents.

In the course of the manufacture of such photocells, it has appeared that the operation for adhering the grid to the copper sulphide layer porduced a surface oxidation of the latter. This oxidation, which is due to the fact that the appropriate adhering operation is carried out hot in an atmosphere which is difficult to control, results in a marked decrease in the efficiency of the photocell.

To overcome this drawback, the oxidized $Cu_2S$ layer must be reduced chemically. This oxide reducing operation is delicate since it must be carried out with high precision.

An object of the present invention is to provide a method which permits reducing the oxidized $Cu_2S$ layer in a very precise manner. According to the invention, the photocell to which the grid has just been adhered is dipped into a solution of cuprous ions and withdrawn therefrom when the curve representing variations with respect to time of the potential difference between the photocell and a pure copper electrode dipped in the same solution passes through its minimum value.

Preferably, the solution of cuprous ions comprises, for 1 litre of water, 25 grams of CuI and 500 grams of KI to which a reducing compound, for example hydrazine monobromide, is added.

By the application of the method according to the invention, which is simple and easy to carry out, there is obtained, after adhesion of the grid, a stoechiometrically compensated layer of $Cu_2S$.

Figure 1:
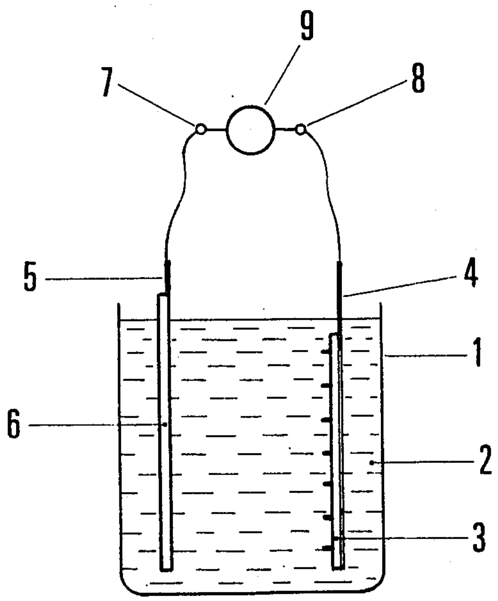
Figure 2:
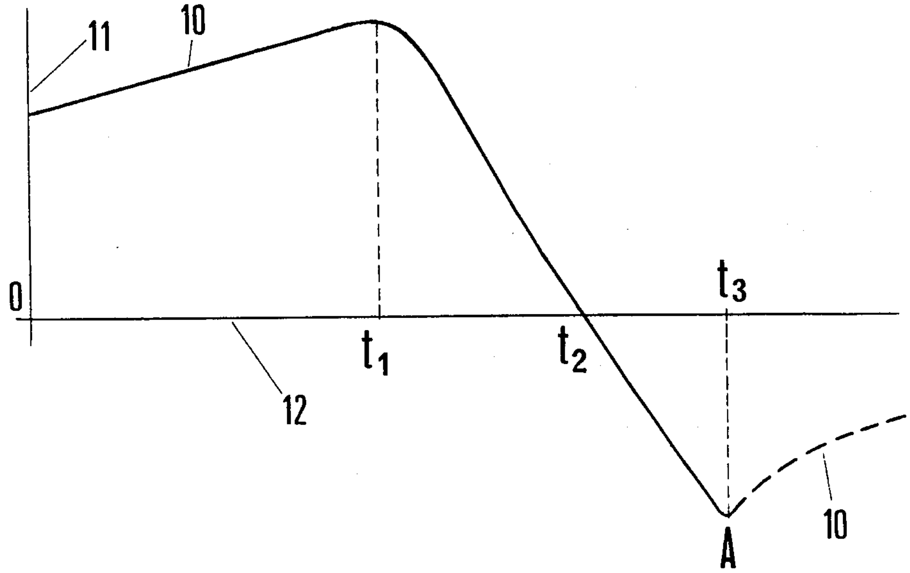

The ensuing description will be better understood with reference to the accompanying drawing in which:

FIG. 1 is a diagrammatic sectional view illustrating how the method according to the invention is carried out, and FIG. 2 shows a curve representing the variations in potential recorded between the photocell and a pure copper electrode both of which are dipped into a solution of cuprous ions.

FIG. 1 represents a tank 1 filled with a solution of cuprous ions 2 into which the photocell 3 being manufactured is dipped. At this stage of its manufacture, the photocell comprises a polyimide film support, a layer of silver, to which there is made a connection 4 of an electrode, a layer of zinc, a layer of CdS, a layer of $Cu_2S$ and a grid adhered to the latter.

According to the invention, the connection 4 of the photocell and the connection 5 of a pure copper electrode 6 are connected to the terminals 7 and 8 of a voltmeter 9 having a high impedance. There is read off from this voltmeter 9, which will advantageously be a recording voltmeter, a curve such as curve 10 shown in FIG. 2. In the latter, where the ordinates axis 11 is graduated in positive and negative voltages and the abscissae axis 12 in times, there is observed during a first period, from 0 to $t_1$, an increase in the potential difference between 4 and 5, followed in a second period, from $t_1$ to $t_3$, by a rapid decrease in this potential which becomes zero at time $t_2$ and then continues to decrease to a point A corresponding to time $t_3$. According to the invention, at this precise time $t_3$ after its immersion at time 0 in the bath of cuprous ions 2, the photocell 3 must be withdrawn from this cuprous bath. At this instant, the layer of oxidized $Cu_2S$ is completely reduced. If the photocell is not withdrawn from the bath at this instant $t_3$, the potential difference between 4 and 5 then describes the end of the curve 10 shown in dotted line in FIG. 2, said potential difference tending slowly to 0 while the surface of the photocell is covered with a layer of copper.

The method according to the invention improves on the various methods of manufacturing CdS photocells in which a conductive grid is adhered to the surface of $Cu_2S$.

By the application of the method of manufacturing photocells according to the invention, there are obtained photocells having an energy efficiency higher than that of photocells manufactured at the present time.

What we claim is:

1. In a method for manufacturing a CdS photocell which comprises adhering a collector grid to a layer of $Cu_2S$, reducing oxidized copper sulfide on the surface of said layer by dipping the photocell to which the grid has just been adhered into an aqueous solution of cuprous ions and then removing the photocell from said solution; the improvement which comprises permitting the reduction of said oxidized copper sulfide by said aqueous solution to proceed until the curve representing the variation with respect to time of the potential difference between the photocell and a pure copper electrode dipped into the same solution, passes through its minimum value, and then removing said photocell from said aqueous solution.

2. The method of claim 1 wherein said aqueous solution of cuprous ions comprises, per liter of water, 25 grams of CuI and 500 grams of KI to which hydrazine monobromide is added as a reducing compound.

* * * * *

UNITED STATES PATENT OFFICE
CERTIFICATE OF CORRECTION

Patent No. 3,885,058 Dated May 20, 1975

Inventor(s) THUOC NGUYEN DUY, WOLFGANG PALZ and JACQUES VEDEL

It is certified that error appears in the above-identified patent and that said Letters Patent are hereby corrected as shown below:

On the title page:

The Assignee is -- Societe Anonyme de Telecommunications, Paris, France, a French company --

The Attorney, Agent, or Firm is -- Jacobs & Jacobs, P.C. --

Column 1, line 12 change "HEITANEN" to -- HIETANEN --

Column 1, line 31, change "porduced" to -- produced --

Signed and Sealed this

*twenty-fifth* Day of *November 1975*

[SEAL]

*Attest:*

RUTH C. MASON
*Attesting Officer*

C. MARSHALL DANN
*Commissioner of Patents and Trademarks*